F. J. BALDWIN.
ARBOR.
APPLICATION FILED MAR. 30, 1918.
1,339,877.
Patented May 11, 1920.
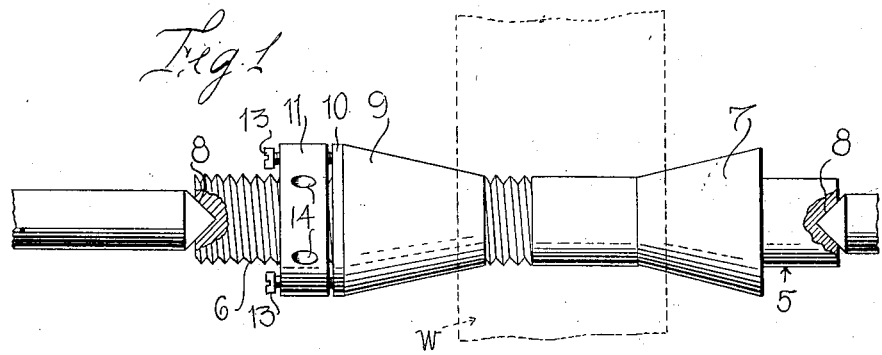
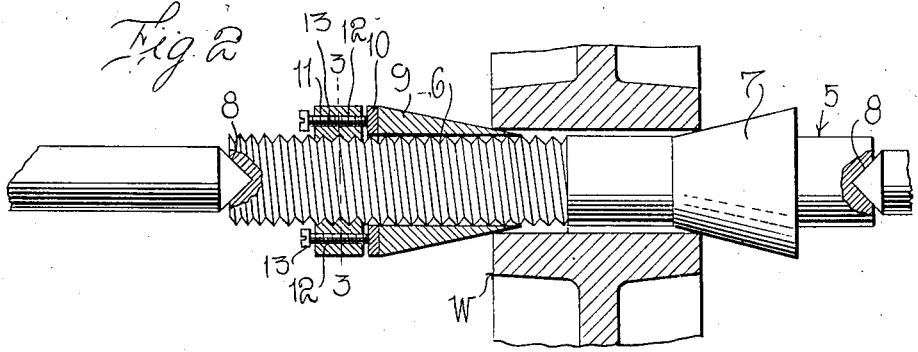
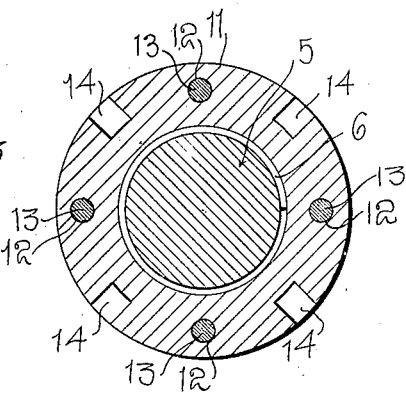
Inventor
Francis J. Baldwin
By Watson E. Coleman
Attorney

UNITED STATES PATENT OFFICE.

FRANCIS J. BALDWIN, OF CANTON, OHIO.

ARBOR.

1,339,877.  Specification of Letters Patent.  Patented May 11, 1920.

Application filed March 30, 1918. Serial No. 225,717.

*To all whom it may concern:*

Be it known that I, FRANCIS J. BALDWIN, a citizen of the United States, residing at Canton, in the county of Stark and State of Ohio, have invented certain new and useful Improvements in Arbors, of which the following is a specification, reference being had to the accompanying drawings.

This invention relates to an improved arbor and has for its primary object to provide a work holding arbor for lathes and similar machines which is provided with means whereby pieces of work of various shapes and sizes may be securely held upon the arbor.

It is also another object of the invention to provide an arbor having an enlarged tapering portion at one of its ends, a conical clamping member loosely engaged on the arbor, and means adjustable upon the arbor and coacting with said clamping member to clamp the work on the arbor between said member and the enlarged tapering end of the arbor.

It is also another important object of the invention to provide improved means for locking the adjusting means for the clamping member to effectually prevent movement of said member from its adjusted position.

And it is a further general object of my invention to provide a work arbor as above characterized which is very simple and durable in its construction, highly convenient and serviceable in practical use, and can be manufactured at relatively small cost.

With the above and other objects in view, the invention consists in the improved combination, construction, and relative arrangement of the several parts, as will be hereinafter more fully described, subsequently claimed and illustrated in the accompanying drawing in which similar reference characters designate corresponding parts throughout the several views, and wherein:—

Figure 1 is a side elevation of an improved work holding arbor illustrating the preferred embodiment of the invention;

Fig. 2 is a longitudinal section thereof; and

Fig. 3 is a section taken on the line 3—3 of Fig. 2.

Referring in detail to the drawing, 5 designates the arbor which may be of any preferred length and diameter. The major portion of this arbor is threaded as at 6 and in spaced relation to the inner end of said threaded portion the arbor is formed with a tapering enlargement 7, the periphery of which gradually merges into the periphery of the arbor body. Each end face of the arbor is centrally formed with a conical seat 8 for the lathe centers or spindles.

A conical clamping member 9 is loosely engaged upon the threaded section of the arbor 5, the inclined face thereof being opposed to the inclined surface of the enlargement 7 of the arbor. A washer plate 10 is engaged upon the arbor and against the end face of the clamping member 9. A lock nut 11 is then threaded upon the arbor 5 against the washer plate and by the adjustment of this nut, the member 9 may be forced longitudinally and its inner end projected into the bore or opening of a pulley, bushing, bearing or other piece of work indicated at W, which is arranged upon the arbor between said clamping member and the arbor enlargement 7. The work at its other end is forced into tight frictional engagement with the inclined face of said enlargement.

The nut 11 is formed with a plurality of threaded openings 12 extending therethrough to receive the set screws 13. These set screws are adapted to be adjusted into binding engagement against the face of the washer plate 10 so that said washer plate will be securely held against turning movement relative to the clamping member 9. The nut will likewise be held against turning upon the arbor with respect to the washer plate. Thus, the nut is securely locked in its adjusted position and the work will be rigidly clamped and held against longitudinal shifting movement. The nut 11 is provided in its peripheral face with a plurality of spaced sockets or recesses 14 to receive a suitable spanner wrench whereby the nut may be readily adjusted upon the arbor 5.

From the foregoing description taken in connection with the accompanying drawing, the construction, manner of use and several advantages of the device will be clearly and fully understood. The several parts can be very easily and quickly assembled after the work has been positioned on the arbor, and the latter then properly and securely clamped in position. By means of the device, the work may be accurately turned, as relative movement of the several parts, due to vibration of the machine, is obviated by the provision of my locking means for the adjustable work clamping member. The several parts of the device being of very simple form, are not liable to get out of order and can also be produced at comparatively small manufacturing cost.

While I have herein shown and described the preferred construction and arrangement of the several elements, it is to be understood that the device is susceptible of considerable modifications therein and I therefore reserve the privilege of adopting all such legitimate changes as may be fairly embodied within the spirit and scope of the invention as claimed.

Having thus described my invention, what I claim is:—

An arbor having a threaded section and an integral tapering enlargement merging into the periphery of the arbor in spaced relation to the threaded section, a longitudinally adjustable conical work clamping member loosely engaged on the threaded section of the arbor, a washer plate loose upon the arbor and engaged against one end of said clamping member, a nut threaded upon the arbor to coact with said washer and urge the clamping member in operative engagement with a work piece and rigidly clamp the work piece between the clamping member and the enlargement on the arbor, and a plurality of set screws threaded in said nut for binding engagement with the washer to hold the nut and washer against relative rotation upon the arbor and clamp the washer plate against the end of said work clamping member.

In testimony whereof I hereunto affix my signature in the presence of two witnesses.

Mr. FRANCIS J. BALDWIN.

Witnesses:
 GLADYS B. HARRIS,
 URBAN A. WERNER.